Patented Nov. 6, 1928.

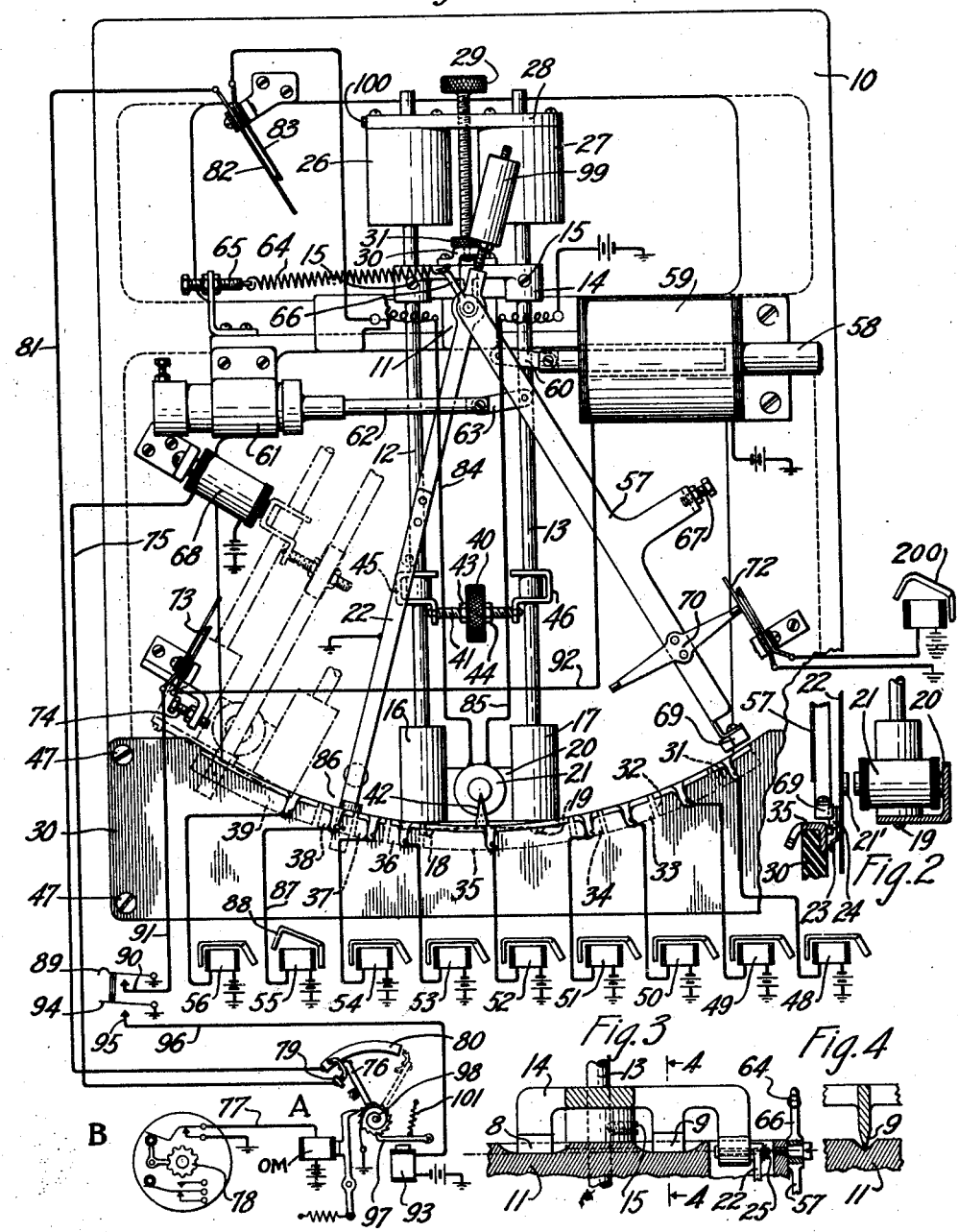

1,690,269

UNITED STATES PATENT OFFICE.

WILLIAM T. BOOTH, OF FLUSHING, AND ARTHUR C. MAGRATH, OF NEW DORP, NEW YORK, ASSIGNORS TO WESTERN ELECTRIC COMPANY, INCORPORATED, OF NEW YORK, N. Y., A CORPORATION OF NEW YORK.

TESTING DEVICE.

Application filed October 21, 1924. Serial No 745,030.

This invention relates to a testing device, and more specifically to a time measuring device which is particularly well adapted for use for testing the speed of impulse senders or calling dials of the type generally used for controlling the operation of switches in automatic telephone exchanges, such as selectors and connector switches and the like. These dials are adjusted to send impulses over the telephone line to control the setting of the switches, and any variation in the speed of these dials may cause the switch to establish wrong telephone connections.

The object of this invention is to provide a testing device which will be simple, efficient, cheap to manufacture and wherein the speed of the dial to be tested is readily indicated.

In accordance with this invention, a dial tester is provided wherein a gravity pendulum and a contacting pointer are held in a starting position by an electromagnet, the energization of which is controlled by the impulse sender to be tested. The impulse sender in being operated, releases the pendulum. The pointer is held and carried by the pendulum while the sender is operating through the energization of a magnet carried by the pendulum. Instantly upon the termination of the operation of the sender, the pointer is released and springs into engagement with one of a number of segments disposed on the frame of the instrument, the particular segment engaged depending on the speed of the dial. The pendulum swings freely after the pointer is released.

The segments referred to are electrical contacts connected to annunciators adapted for visually or otherwise indicating the speed of the sender. A third magnet or solenoid may be employed to reset the pendlum and pointer, this solenoid being operated by a circuit closed by the actuation of a key to move an arm which engages the pendulum and pointer to reset them. In order to control the release of the start magnet and the magnet holding the pointer to the pendulum, an automatic switch, preferably a stepping switch, is provided which starts operating when the sender begins to transmit impulses, and on its first step opens the start magnet circuit, and on receipt of the last impulse from the sender opens the circuit of the pointer control magnet to allow the pointer to spring into contact with the segment it happens to be opposite at that moment.

When the key referred to is operated, the release magnet of the stepping switch is operated to withdraw the holding pawl to allow a retracting spring to restore the stepping switch to normal, in which position it recloses the start magnet and hold magnet circuits so that when the pendulum and pointer reach the start position under control of the solenoid referred to, these magnets are energized and hold the pendulum and pointer in their normal positions ready for another measuring operation.

Other features will appear from the following description taken in connection with the accompanying drawing, which shows the preferred embodiment of this invention in which:—

Fig. 1 is a front assembly view of the time measuring device. Fig. 2 is a detail view of the pendulum showing the resilient arm in contacting relation with an associated segment. Figs. 3 and 4 are partial views of the fulcrum of the pendulum showing the contacting and resetting arms in position on their respective supports and Fig. 5 is a partial view of the plate holding the annunciators.

The time measuring device of this invention generally consists of a frame 10 which is provided with a laterally extending bracket 11 better seen in Fig. 3. This bracket is provided with two coaxially disposed V shaped grooves in which the prisms 8 and 9 forming the fulcrum of a compound pendulum rest as shown in Figs. 3 and 4. These two prism shaped portions 8 and 9 are preferably integrally formed with a bracket 14 in which the two parallelly disposed rods 12 and 13 are mounted and held securely thereon by means of screws 15. The pendulum weights 16 and 17 are mounted on the downward extending portions of rods 12 and 13 which are held in spaced relation at this point by means of a bracket 20 held on the rods by means of screws 18 and 19.

Bracket 20 carries a magnet 21 which is disposed in operable relation with a resilient conducting arm 22 provided with a contact point 23 integrally formed with a hook portion 24. Arm 22 is loosely mounted on pivot 25 which is disposed coaxially with the pivotal axis of the pendulum.

On the upward extending portions of rods 12 and 13 and disposed above the pivotal points of the pendulum, are loosely mounted the compensating weights 26 and 27. These weights are secured to a yoke 28 which carries a screw 29 the end of which rests on a bearing 30 mounted on the bracket 14. This screw is provided for raising or lowering the weights 26 and 27 for adjusting the oscillating period of the pendulum in a manner well known in the art. A counter-nut 31 is provided for locking screw 29 and the weights 26 and 27 carried thereby in adjusted position.

At a suitable distance below the pivotal point of the pendulum and supported by the rods 12 and 13 there is provided an adjustable weight 40 adapted to be moved laterally along the screw 41 for moving the center of gravity of the pendulum and the magnet 21 in alignment with the pointer 42 disposed in the central portions of sector 30. The weight 40 is held in adjusted position on the screw 41 by means of counter-nuts 43 and 44. The screw 41 is rigidly fastened on brackets 45 and 46 which are held on the rods 12 and 13 by any suitable fastening means.

The sector 30 is preferably made of insulating material and is securely held on the lower portion of the frame 10 by means of screws 47. This sector is provided with a plurality of contacting segments 31, 32, 33, 34, 35, 36, 37, 38 and 39 disposed in a plane parallel to the path described by the pendulum and contacting arm 22.

The contacting segments 31, 32, 33, etc., are electrically connected with their respectively associated annunciators 48, 49, 50, 51, 52, 53, 54, 55 and 56 which cooperate with the contacting arm 22 for indicating the speed of the impulse sender in a manner that will be hereinafter described.

On the front portion of bracket 11 there is pivotally mounted a resetting arm 57 shown in Figs. 1, 2 and 3, which is attached to the plunger 58 of electromagnet 59 by means of a link 60.

Opposite magnet 59 there is disposed an air-dash pot 61 having a rod 62 connected to the resetting arm 57 by means of link 63. A spring 64 hooked on the adjusting screw 65 and on the upward extending portion 66 of resetting arm 57 is provided for returning the plunger 58, rod 62 and the resetting lever 57 connected thereto in normal non-operated position against the contact springs 72, the function of which will be hereinafter described.

The resetting arm 57 carries an adjustable stop 67 adapted to engage the bracket 46 for moving the pendulum and the bracket 45 carried thereby in starting position against the core of a start magnet 68. On the downward extending end portion of resetting arm 57 there is provided a catch member 69 adapted to engage and move the contacting arm 22 and the pole piece 21' carried thereby in alignment with the core of magnet 21 with which it is associated. An adjustable stop 74 mounted on the frame 10 is adapted for limiting the movement of the arm 57.

The resetting arm 57 carries a spring operating member 70 which extends laterally therefrom in operable relation with the pairs of contact springs 72 and 73 respectively. The springs 72 are adapted to close the circuit of an annunciator (200) which may be provided for indicating that the resetting arm 57 is in normal non-operated position thereby preventing the operation of the impulse sender to be tested while this resetting lever moves the pendulum and the contacting arm in normal or starting position.

The contact spring 73 cooperates with the stop 74 for limiting the movement of arm 57 and to open the operating circuit of magnet 59 when the pendulum and the contacting arm 22 are in normal starting position against the core of magnet 68 as shown by the dotted lines in Fig. 1.

The operation of the time measuring device and its operating circuits are as follows:

The pendulum is normally held in starting position by means of electromagnet 68 which energizes in a circuit from grounded battery, the coil of magnet 68, conductor 75, segment 79 and brush 76 of a stepping switch A to ground. The operating magnet OM of switch A is energized in a circuit from grounded battery, the coil of the stepping magnet, conductor 77, the impulse springs of the impulse sender to be tested to ground. Upon the operation of the sender the wiper 76 is moved ten steps in the position indicated by the dotted line. Upon the first movement of wiper 76 from normal, the operating circuit of magnet 68 is opened at contact 79. This magnet releases the pendulum and the contacting arm 22, held in operable relation therewith through the energization of electromagnet 21, is carried during this measuring period in a path adjacent the contacting segments 31—32, etc. At the end of the pulsing operation the wiper 76 is moved clear of segment 80 as shown by the dotted line, thus causing the deenergization of magnet 21 which permits the arm 22 to spring into contact with one of its associated segments 31—32, etc. under the medium of its own tension.

Magnet 21 was energized in a circuit from ground, wiper 76 of the stepping switch A, conducting segment 80, conductor 81, closed contact springs 82 and 83, conductor 84, the winding of magnet 21, conductor 85 to battery and ground. It is to be noted that the contacting segment with which the arm 22 may contact at the end of each pulsing operation depends solely upon the speed at which the impulses are sent through the stepping switch A with respect to the time element which is generally adjusted to move from its starting point to the segment 31 in one second's time.

Upon the contact of arm 22 with one of its associated segments for example, as shown at 86 in Fig. 1, the circuit of annunciator 55 is closed through ground, the metallic portion of contact arm 22, segment 38, conductor 87, the winding of magnet 55 to battery and ground. This magnet attracts its armature and moves the shutter 88 carried thereby from the front portion of its associated magnet on which the number of impulses per second particular to this segment is visually indicated.

The resetting of the switch A, the pendulum and the contacting arm carried thereby is effected simultaneously through the depression of key 89 which closes a circuit for electromagnet 59 through ground, spring 90, conductor 91, closed contact spring 73, conductor 92, winding of magnet 59 to battery and ground. The magnet 59 energizes in the circuit and operates the arm 57 against the resistance of the air-dash pot 61 and retracting spring 64. The stop 67 carried by this resetting arm in its path engages the bracket 46 and the catch 69 engages the hook 24 of arm 22 for moving the pendulum and the contacting arm in normal non-operated position as shown by the dotted line in Fig. 1.

The movement of spring 94, arranged to be moved simultaneously with key 89, closes a circuit for magnet 93 through ground, springs 94 and 95, conductor 96, the winding of magnet 93 to battery and ground. This magnet energizes and operates the pawl 97 of the stepping device against the resistance of spring 101 to permit the wiper 76 to return to normal non-operated position under the tension of a spiral spring 98 thus closing the circuits of magnets 21 and 68 which remain energized in these circuits for holding the pendulum and the arm 22 in starting position.

Spring 82 normally in contact with spring 83 is disposed in operative relation with the insulating member 100 carried by the compensating weight 26 and is adapted for opening the circuit of magnet 21 to prevent the contacting arm 22 from passing beyond the outermost disposed segment 31.

What is claimed is:

1. A dial tester consisting of a gravity pendulum, a magnet for holding the pendulum off-center, a pointer, a magnet for holding the pointer to the pendulum, an impulse sender, and circuits controlled by said impulse sender for successively deenergizing said magnets at the beginning and termination of a set of impulses transmitted by the sender.

2. A dial tester consisting of a gravity pendulum, a magnet for holding the pendulum off-center, a contact arm, a magnet on the pendulum for holding the arm to the pendulum, an impulse sender, circuits controlled by said sender for successively deenergizing said magnets at the beginning and termination of a set of impulses transmitted by said sender, a row of contacts one of which the contact arm engages when released, and signal devices connected to the respective contacts for indicating the elapsed time.

3. In a testing device, an impulse sender, a pendulum, a contacting arm pivoted on said pendulum, an armature carried by said pendulum, a magnet cooperating with said armature for holding said pendulum and said arm in starting position, a magnet carried by said pendulum for operatively holding said arm to said pendulum, a switching device operable in response to the movement of said sender for releasing the pendulum from the first mentioned magnet upon the first impulse from the sender, means operable upon the last impulse from the sender for releasing the arm from the last mentioned magnet for indicating the speed of said sender, and means for returning said pendulum and said arm to their starting position.

4. In a testing device, the combination of an impulse sender, a pendulum, a magnet for holding said pendulum in the starting position, another magnet, a contacting member held in operable relation with said pendulum through the energizing of the last mentioned magnet, indicator devices controlled by the movement of said member, a step-by-step switch operable through the movement of said sender for causing the deenergization of one of said magnets at the beginning of the impulses and the deenergization of the second mentioned magnet at a point depending upon the speed of said sender for causing the operation of one of said devices for indicating the speed of said sender, a circuit for each of said magnets, and a solenoid for restoring the pendulum and member to normal position.

5. In a testing device, the combination of an impulse sender, a normally non-operating time element, electromagnetic means for holding said element in starting position, a pivoted conducting member, a magnet operatively connecting said member with said element, contacts positioned in a path parallel to the movement of said member, indicating devices operatively connected to said contacts, and a stepping mechanism for releasing the time element from the electromagnetic means at the beginning of the set of impulses, and releasing the conducting member from the element at the end of the set of impulses to operate one of said devices upon the engagement of said member with one of said contacts.

In witness whereof, we hereunto subscribe our names this 16th day of October, A. D. 1924.

WILLIAM T. BOOTH.
ARTHUR C. MAGRATH.